United States Patent
Tormasov et al.

(10) Patent No.: US 7,209,973 B2
(45) Date of Patent: Apr. 24, 2007

(54) DISTRIBUTED NETWORK DATA STORAGE SYSTEM AND METHOD

(75) Inventors: Alexander Tormasov, South San Francisco, CA (US); Sergei Beloussov, Singapore (SG); Stanislav Protassov, Singapore (SG)

(73) Assignee: SWSOFT Holdings, Ltd. (BM)

( * ) Notice: Subject to any disclaimer, the term of this patent is extended or adjusted under 35 U.S.C. 154(b) by 910 days.

(21) Appl. No.: 09/918,032

(22) Filed: Jul. 30, 2001

(65) Prior Publication Data

US 2002/0147815 A1 Oct. 10, 2002

Related U.S. Application Data

(60) Provisional application No. 60/282,468, filed on Apr. 9, 2001.

(51) Int. Cl.
*G06F 15/16* (2006.01)

(52) U.S. Cl. .................. 709/231; 709/232; 709/226

(58) Field of Classification Search ............. 709/226, 709/225, 213, 219, 243, 231, 232; 707/200
See application file for complete search history.

(56) References Cited

U.S. PATENT DOCUMENTS

| | | | |
|---|---|---|---|
| 5,155,847 A | 10/1992 | Kirouac et al. ............. 395/600 |
| 5,305,326 A | 4/1994 | Solomon et al. ........... 371/11.1 |
| 5,434,994 A | 7/1995 | Shaheen et al. ............ 395/500 |
| 5,513,314 A | 4/1996 | Kandasamy et al. ... 395/182.04 |
| 5,537,533 A | 7/1996 | Staheli et al. | |
| 5,713,017 A | 1/1998 | Lin et al. ..................... 395/608 |
| 5,729,763 A | 3/1998 | Leshem | |
| 5,742,792 A | 4/1998 | Yanai et al. ................ 395/489 |
| 5,768,623 A | 6/1998 | Judd et al. | |
| 5,774,643 A | 6/1998 | Lubbers et al. | |
| 5,835,911 A | 11/1998 | Nakagawa et al. ......... 707/203 |
| 5,996,086 A | 11/1999 | Delaney et al. | |
| 6,029,195 A * | 2/2000 | Herz .......................... 725/116 |
| 6,052,380 A * | 4/2000 | Bell ............................ 370/445 |
| 6,067,635 A | 5/2000 | DeKoning et al. | |
| 6,078,929 A * | 6/2000 | Rao ............................ 707/200 |

(Continued)

OTHER PUBLICATIONS

Anderson, Tom, et al. 1995. Serverless Network File Systems. *15th Symposium on Operating Systems Principles, ACM Transactions on Computer Systems.*

(Continued)

*Primary Examiner*—Rupal Dharia
*Assistant Examiner*—Nghi Tran
(74) *Attorney, Agent, or Firm*—Bardmesser Law Group (57) ABSTRACT

The present invention is a system and method for distributed, highly scalable, wide area peer-to-peer network data storage. The functionally equivalent servers in the system are divided into groups. Each server maintains a dynamic list which is polled to determine the availability of the closest neighbor servers. Each server is switched between the groups of servers to optimize network connectivity parameters. Data and directory files are divided into a plurality of pieces which are stored on different servers. Files are uniformly and independently named, utilizing a tree with a common root, logical pathways, and unique file identifiers. When a server receives a client request for file system access, the plurality of file pieces are collected and sent to the client server from the neighbor servers simultaneously in order to optimize bandwidth. Servers with maximum throughput capacity are utilized for highest transmission speed and reduced processing time.

44 Claims, 7 Drawing Sheets

U.S. PATENT DOCUMENTS

| | | | |
|---|---|---|---|
| 6,092,178 | A | 7/2000 | Jindal et al. .................. 712/27 |
| 6,101,558 | A * | 8/2000 | Utsunomiya et al. .......... 710/6 |
| 6,157,991 | A | 12/2000 | Arnon |
| 6,163,856 | A | 12/2000 | Dion et al. .................... 714/4 |
| 6,173,293 | B1 | 1/2001 | Thekkath et al. ........... 707/201 |
| 6,173,377 | B1 | 1/2001 | Yanai et al. |
| 6,212,640 | B1 | 4/2001 | Abdelnur et al. ........... 713/201 |
| 6,279,138 | B1 | 8/2001 | Jadav et al. |
| 6,330,687 | B1 | 12/2001 | Griffith |
| 6,532,548 | B1 | 3/2003 | Hughes |
| 6,567,891 | B2 | 5/2003 | Oldfield et al. |
| 6,760,763 | B2 * | 7/2004 | Jennings et al. ............ 709/224 |
| 2002/0046405 | A1 * | 4/2002 | Lahr .......................... 725/87 |
| 2002/0078461 | A1 * | 6/2002 | Boykin ........................ 725/87 |
| 2002/0083118 | A1 * | 6/2002 | Sim .......................... 709/105 |
| 2002/0087885 | A1 * | 7/2002 | Peled et al. ................. 713/201 |
| 2003/0014419 | A1 * | 1/2003 | Clapper ...................... 707/101 |
| 2003/0115251 | A1 * | 6/2003 | Fredrickson et al. ........ 709/201 |

OTHER PUBLICATIONS

Bach, Maurice, 1987. *Design of the Unix Operating System by Marice J. Bach*, Maurice Bach. 1 edition (Feb. 27, 1987) Prentice Hall; ISBN: 0132017997.

Beheler, Ann. *Data Communications and Networking Fundamentals Using Novell Netware* (4.11) Prentice Hall/1998/0135920078.

Braam, P.J. 1998. *The Coda Distributed File System* (# 74) Linux Journal, #50 Jun. 1998.

Campbell, Richard and Campbell, Andrew. 1997. *Managing AFS: The Andrew File System*. Prentice Hall 1, ISBN: 0138027293.

Pawlowski, Brian, et al. 1994. *NFS Version 3 Design and Implementation*. USENIX Summer 1994.

Crowley, Charles 1997 *Operating Systems: a design-oriented approach*. Irwin. 1997. ISBN 0-256-15151-2.

Davis, Roy G. *VAXcluster Principles*. Digital Press. ISBN 1-55558-112-9.

*The Design and Implementation of the 4.4BSD Operating System* (*Unix and Open Systems Series.*) by Marshall Kirk McKusick (Editor), Keith Bostic, Michael J. Karels (Editor) Addison-Wesley Pub Co; ISBN: 0201549794.

"The Distributed File System (DFS) for AIX/6000", May 1994, IBM, Doc. No. GG24-4255-00, pp. 1-15.

Kumar, R. Fall 1991. "OSF's Distributed Computing Environment", Aixpert, IBM Corporation, pp. 22-29.

Lebovitz, G. Feb. 1992, "An Overview of the OSF DCE Distributed File System", Aixpert, IBM, pp. 55-64.

McCoy, Kirby. 1990. *VMS File System Internals*. Digital Press, ISBN 1-55558-056-4, 1990.

Network Working Group "Request for Comments: 1945 Hypertext Transfer Protocol—HTTP/1.0."

Pfister, Gregory F. 1998. *In Search of Clusters*. Second edition. Prentice Hall, ISBN 0-13-899709-8.

Rosenberry, W., et al. Sep. 1992. "Understanding, DCE", O'Reilly & Associates, Inc. Publishers, pp. 6-100.

Satyanarayanan, M. 1989. Coda: A Highly Available File System for a Distributed Workstation Environment (190 13) Proceedings of the Second IEEE Workshop on Workstation Operating Systems Sep. 1989, Pacific Grove, CA.

Lee and Katz, "An Analytic Performance Model of Disk Arrays", 1993, ACM, pp. 98-109.

\* cited by examiner

/aaa/bbb/c

| abc |
| aaa |
| cde |
| zzz |
| xyz |

| abc |
| bbb |
| cde |
| zzz |
| xyz |

DISTRIBUTED NETWORK DATA STORAGE SYSTEM AND METHOD

REFERENCE TO RELATED APPLICATIONS

This application claims the benefit of U.S. Provisional Application for Patent No. 60/282,468 titled "Distributed Highly Scalable Wide Area Peer To Peer Network Data Storage With Uniform Name Space And Self Optimized Delivery Model" filed on Apr. 9, 2001 for priority under 35 U.S.C. § 119(e), is related thereto, is commonly assigned therewith, and the subject matter thereof is incorporated herein by reference in its entirety.

BACKGROUND OF THE INVENTION

1. Field of the Invention

The present invention pertains to distributed data storage; more particularly, the present invention describes a distributed, highly scalable, wide area peer-to-peer network data storage system and method.

2. Background of the Invention

The problem of data storage in a computer network appeared immediately after computers started to be connected to one another. The data storage problem has typically been solved by providing one of the computers with the necessary service, i.e., by organization of the file server. When one of the computers has an organized file server, the other computers in the network have software installed that provides the work using the files saved on the correspondent servers. For example, the data storage files could be copied locally; or, more conveniently, access to the network data storage files could be imitated if the data storage files are saved on a virtual hard disk. DOS software usable on IBM personal computers was developed in such a way. For IBM computers, the client software that was to be installed would provide a user with a so-called network drive, if the connection to the network and to the corresponding file server was successful. Physically, network data storage files were located on the remote file server, but for the programs running on the client computer, they appeared to the user as if they were on local servers (Beheler 1987).

The foregoing system for providing access to the stored data implies a separated file server and client computer server access model. This means that it appears to the user that there are separated roles in the network—the roles of client and server (Crowley 1997).

While workable, the data storage system described above has many disadvantages. For example, every data storage file being accessed "pseudo-locally" actually resides on a remote server. In case somebody tries to provide the stored file with shared access, (i.e., several clients have a chance to see the same file) the programs running on the client computer (not knowing about the data storage scheme) can start writing in the same file. Writing in the same file can lead to content errors.

The next problem is that the data storage file itself, being situated on only one server (and more importantly, on one hard disk), cannot be accessed in case of failures in the data storage file server equipment, network problems, or server software failures (i.e., many "failure points" appear, which means "no access" to the data). Such inability to access data even appears in case of workable server equipment when a computer user must reboot an operating system. When rebooting a data storage file, access service becomes unavailable for the clients, which means a break in use again.

One of the solutions to the problem of accessibility to data storage files is to use the clusterization principle. The best-known data storage solution was implemented in the platform developed by Digital Equipment (DEC) company. The clusterization principle was based on the creation of a special hard disk array that could hold data and be connected to several processor units (computers) (Davis). In clusterization, sharing access to a data storage file was done by using special equipment, and not only by the separated computer.

This use of special equipment enabled the full interchangeability of all the processor units. The equipment that managed the clusterization support was of minor complexity, and therefore had higher reliability when compared with the separate computer. Particularly, it meant the absence of the clusterization process support software and the associated mistakes. Nevertheless, the special client software was to be installed into the operating systems of the client computers. Clusterization solved the problem of computers' interchangeability and the computer's independence of the services to which any client computer had access. Nevertheless, the equipment failure of clusterization hardware led to the problem of service unavailability.

More problems appear if the server and its data storage services are separated by distance and are connected via the internet. The typical example is a single server with data storage files, which gains access to the data storage services via special network protocols, such as the World Wide Web service protocol called http (Network Working Group). Such network protocols are specifically used in a distributed client-server network that is not as close as the local network described above.

Another Internet service feature is the necessity to service a great number of client computers trying to access necessary data. The number of client computers can be so large that the server itself can become inaccessible when trying to respond to the client computers' requests for data (due to the insufficient network throughput capacity or server's inability to answer every request). That is why it is clear that the approach with one stand-alone server (and even a group of servers located in one place) and client computers connected via the Internet leads to failures caused by the distance between the server and the client.

Therefore, the optimal situation for a client computer is a service or server located in the network closest to the client computer. Because of the large number of client computers, it is clear that it is necessary to have a distributed set of similar servers over the Internet and to choose the closest servers among them.

Such a solution assures a symmetry of service for each client computer, and therefore the same data accessibility for all servers, provided that appropriate connections to the client computers exist. The easiest way to solve this problem is the simple doubling of the data on each server and then providing fully symmetrical service, independent of the client computer and the location it requests to obtain the service (U.S. Pat. No. 6,092,178). Such a decision at the same time presents many additional problems, such as data synchronization.

To provide such a service, dedicated distributed data storage was developed that made it possible to access data storage files. In a distributed data storage system, the distribution of the service means actually running the server processes of the operational systems at the corresponding network unit (at the server) (Davis and Pfister 1998). Such an approach helps to minimize access time and, at the same time, the problem of channel throughput between servers and the client computer.

Simultaneously, a distributed data storage system helps resolve the situation where computational power for the only computer is insufficient to perform all requests because a greater number of computers try to get service at the same time. Even in case of non-parallel request servicing, a distributed data storage system reduces the load on any server because the requests are distributed among the servers available. In addition, the level of resistance to failure grows. If the server becomes unavailable, the client computer can switch to another server and get the same service (determined by the symmetry range of the system servers) (Pfister 1998).

A distributed service must have a distributed data storage system, as the range of client services is usually based on this data.

To implement such distributed storage of data, it is necessary to develop data distribution and data storage algorithms. These algorithms must provide optimal data storage with respect to contents and resource utilization so that they provide the same contents on different servers based on the level of server symmetry.

Presently, these solutions typically use very complicated algorithms to access stored data. Data full duplex (mirroring) is used when every unit of the network has the full copy of the stored data files. For example, Internet FTP server mirror systems use this approach (U.S. Pat. Nos. 5,835,911, 5,434,994, 5,155,847, and 5,742,792).

A general network file system (for example, UNIX NFS system developed by Sun Microsystems, Inc. (Chet 1994) usually means the separated server and the client computer know what server to be connected to. Such general network file systems are usually intended for use with a minimum of separated servers.

Network distributed file systems are arranged in a more complicated way. They generally allow working in a shared uniform namespace whether a specific file server is accessible or not. Namespace is a collection of unique names, where name is an arbitrary identifier, usually an integer or a character string. Usually the term "name" is applied to such objects as files, directories, devices, computers, etc. For example, Open Software Foundation DFS (Distributed File System) is of such structure (Kumar 1991, Lebovitz 1992, Distributed File System, Rosenberry 1992, and Pfister 1998). Its namespace hierarchy stems from a shared point, i.e., root, of a file system. Nevertheless, every DFS name corresponds to a specific file server. Its loss entails disappearance of access to certain files. As this takes place, files get split apart. To make them more accessible, a program finds the way inside the namespace and recognizes the server wanted. Thus, there exists a potential interchangeability of files, but, even if properly organized, fault-tolerance level of the system is not higher than usual.

Another approach is the hierarchical system of file naming, combined with local data caching on a client server. Transarc Corporation (now IBM Transarc Labs) AFS (Campbell 1997) and Coda (Braam 1998 and Satyanarayanan 1989) systems use a hierarchical file naming system. To optimize data access, these systems cache data on the client side using cache to reduce the number of requests to the server. The AFS server broadcasts every request on the file (even on the one situated in cache) to the server data storage file, and only after getting the information that the data storage file has not changed since being copied into a local cache, the system provides access to it. If there is no connection with the data storage file server, the AFS system doesn't usually make it possible to use the data storage file. This can provide a Coda system by taking into account the fact that the files usually don't change and access is not waiting for connection with the file server.

Such an approach is more resistant to failures compared with several dedicated servers, which must be online all the time. Nevertheless, such an approach can lead to problems if several clients working with the same file simultaneously make concurrent changes that can lead to incorrect work in the future. Both approaches imply that the file is saved in cache, which means that there are many copies of the different file modifications in the network. The presence of many copies of different file modifications complicates file system serviceability control, i.e., data coherence. Moreover, these approaches imply that the access to the files that are not in cache will be possible only after their full extract to this cache. Access to files not in cache means that the support of the server system where different data is stored on different servers can lead to access problems in the case where connection to the server is lost.

The other method of distributed file access is the distribution not of the file but of the determination of distributed blocks' storage upon which the file system itself is built. The main problem with such a method is the necessity to place constant locks on the blocks where the internal (usually directory) information is stored due to concurrent access to them.

Another method is to use the approach similar to the one used in a RAID redundant data storage system. The RAID redundant data storage system makes it possible, with little redundancy, to access data even when one of the servers or hard disks becomes inaccessible. This particular method is called Level 5 RAID (Pfister 1998) and is used widely to increase the reliability of a disk array. The Level 5 RAID method was used for the so-called "serverless file system" built at the University of California at Berkeley (Anderson 1995), where the system did not have just one separated file system; rather, it had a group of them. Nevertheless, such realization isn't very flexible and is used for tightly coupled networks. Besides, the system allowed no use of servers with unequal efficiency and connection quality, as data accessibility depended on access to all of the servers, whether they were overloaded or not (with the exception of one with data parity recording). It simply is not suitable for data storage over the Internet.

What is needed is a system and method for distributed network data storage which minimizes content errors, access time and system failures. Such a system and method should maximize reliability, accessibility, and uniformity of data stored within the system. Additionally, there is a need for a method which provides a high degree of data coherence and synchronization, data storage flexibility, and maximum channel throughput and serviceability.

SUMMARY

The present invention is a distributed, highly scalable, wide area peer-to-peer network data storage system and method. The system utilizes a URL system for client access and uniformity of name space. The system storage is based on files which are divided prior to storage into a plurality of functionally equivalent pieces. The number of pieces into which the file is divided exceeds the number necessary to reconstruct the file. The pieces are sent to separate servers for storage. In order to restore a file, an exact number of the functionally equivalent pieces are collected. In the case of an inaccessible server, the file can still be reassembled due to the division and distribution of the unique file pieces.

Network performance characteristics are defined and the "network distance" between the system network servers is established. The servers are organized into groups such that any group has at least one server that is part of another group and that all groups are connected. Each server maintains a dynamic list of neighbor servers which changes over time and which is significantly smaller than the complete list of servers in the system. The determination of the position of a server within the groups is made through a decision iterative process. The server is eventually connected to the group where the distance parameter of the links with the neighbor server is optimal. When the "network distance" between the servers changes over time due to changing load parameters of a channel between the servers, the server arrangement is reassessed in order to optimize response time.

A client can connect to any server in the network to access data storage. The decision iterative process used for the selection of a server connection for a client is the same as that which is used to establish the connection of a new server to the network. Eventually, the client is connected to the server where the distance parameters of the connection to the server are optimized. This process is repeated periodically to ensure that the client connection remains optimal.

In one embodiment of the present invention, the files are divided into common data files and directory files. Every file record contains the logical file name and the unique file identifier. The unique file identifier is used to reconstruct the file at the client level. To write a file, the client divides the file into a plurality of pieces which each have a unique identifier. The pieces are distributed among the servers in the group. To read the file, the client requests the file name and the server transforms the request into a unique identifier. The necessary file pieces are collected and sent to the client and the file is restored. In this manner, the data flows through the less utilized network channels for optimal response time. The pieces are received from the neighbor servers in parallel mode, and several access channels are utilized which results in optimal network loading. The server which is able to transmit a file piece faster will be sending more information. This results is utilization of maximum throughput capacity of the servers for highest transmission speed, reduced processing time, and decreased network overloading.

BRIEF DESCRIPTION OF THE DRAWINGS

A better understanding of the Distributed Network Data Storage System of the present invention may be had by reference to the drawing figures, wherein.

DETAILED DESCRIPTION OF THE EMBODIMENTS

The use of the term "peer-to-peer network", means that the World Wide Web (Internet) is involved in this invention. Specifically, all the servers supporting the WWW-type services have the name that can be written with the help of a URL system (Uniform Resource Locator). Actually, the URL is the address in the peer-to-peer server network. The client that works with the service using the URL usually connects with one separated server and receives all the data from the separated server. The uniformity of name space is guaranteed because the client's access via URL doesn't depend on the client and is unique for each resource.

The storage operates on file level, i.e., the information storage unit the client works with is a file. To provide fault-tolerance, it is suggested that any file to be stored should be divided into pieces in a way that makes it possible to restore the file from the pieces. The number of pieces can be more than necessary for the restoration of one file. Additionally, the pieces must be functionally equivalent such that it is necessary to collect only an exact number of pieces in order to properly restore the file.

To illustrate the present invention, consider a system where the storage is organized by placing every piece of the stored file on a separate server. When implementing a system where every piece of the stored file is on a separate server, switching off some servers does not block access to data because the number of file pieces exceeds what is necessary to reconstruct the file. Therefore, the necessary file pieces can be easily found to restore the file. The absence of a unique piece among the pieces guarantees that where a server cannot be accessed, the file can still be reassembled.

Consider a system where there is some performance characteristic associated with the network where the servers are located. This performance characteristic shows the "network distance" from one server to another. For example, such a performance characteristic can be server-to-server response time or the real channel performance between servers. Of course, these performance characteristics can vary over time. Nevertheless, changes in performance characteristics over time are usually not significant. More particularly, the "network distance" generally does not change. Thus, one can define the distance between the servers.

The servers are organized into groups such that the distance between any two of the servers does not exceed the fixed limit according to the performance characteristics. The size of the group of servers should not be very big, typically 5–10 servers as shown in FIG. 1.

Figure 2:
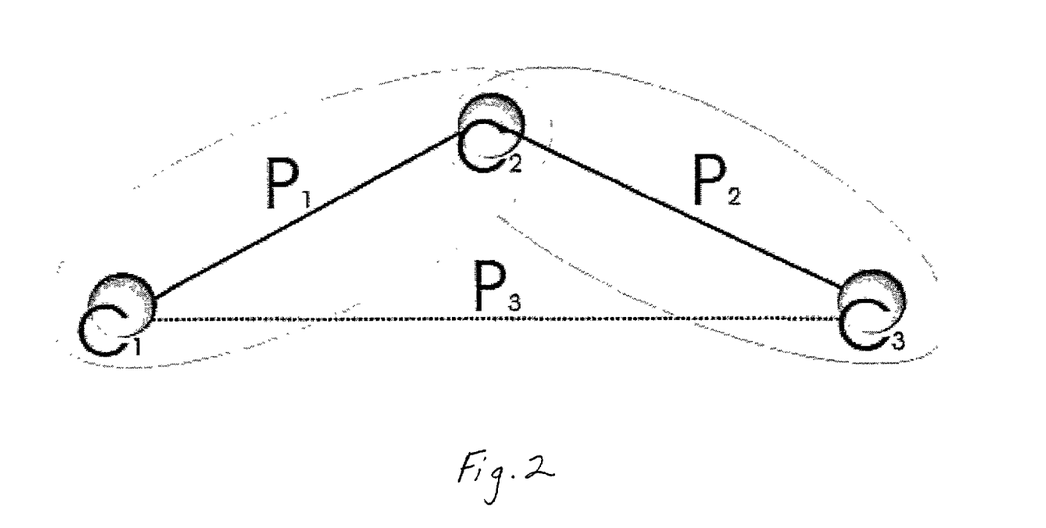
FIG. 2 is a schematic diagram of servers organized into a group based on distance but where the group does not have proper transference.

Assume that the group of servers overlap; i.e., the same server can be part of several groups. It is clear that the transitivity relationship between servers isn't developed: if servers C1 and C2 are in the first group and servers C2 and C3 are in the second group, then correlations D (C1, C2) less than or equal to L and D (C2, C3) less than or equal to L are developed; and correlation D (C1, C3) less than or equal to L is clearly not developed. Here, D (a, b) is the distance between the servers a and b and L is the distance limit. For clarity, a server belonging to two groups (like C2) is called a boundary server (see FIG. 2).

Assume further that any group has at least one server that is part of another group and that all groups are connected.

Figure 1:
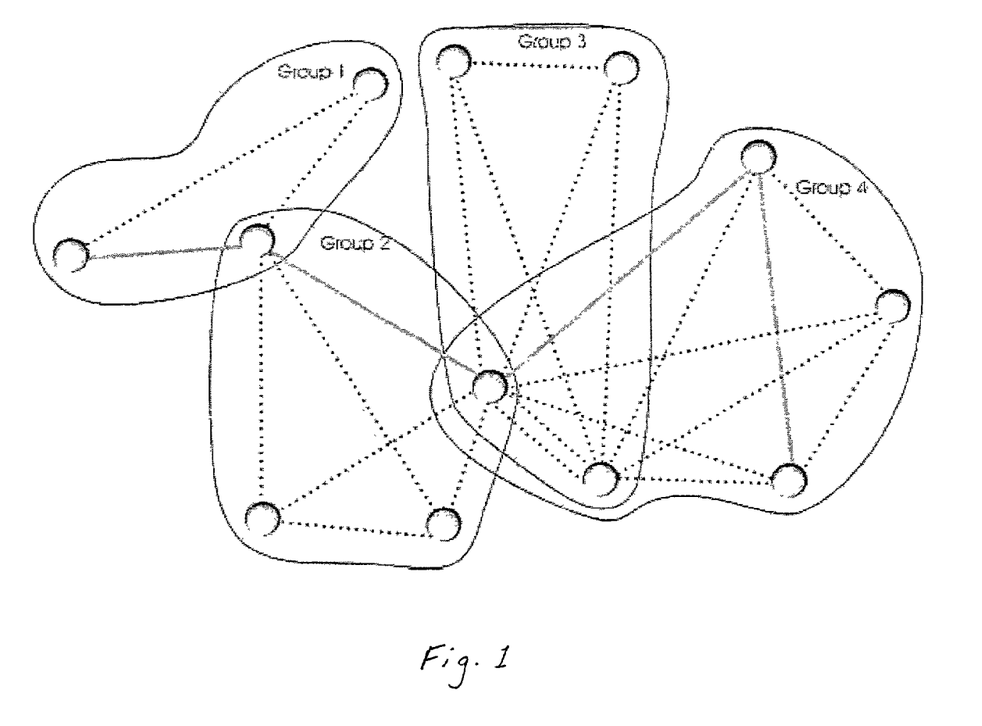
FIG. 1 is a schematic diagram of server computers combined in groups.

Therefore, a path exists from any group to any other group via a set of boundary servers (see FIG. 1—the solid lines connect servers via boundary servers).

The scalability and fault-tolerance of the foregoing system is defined by many factors, especially by the algorithms defining the work stored on all of the servers. All the algorithms acting in the topology of such links of the servers must be of a local character, i.e., there shouldn't be any places in the system where there is a full list of the servers. The same thing can be said about the system for naming the resources: there shouldn't be a single place in the system that could "disturb" the name uniqueness, typically with respect to catalog maintenance. This makes it possible for the system to grow and self-organize, especially when starting new servers in the Internet-like network. The addition of new servers and switching off of old ones influences only their closest neighbors and does not depend upon network size.

Thus, each server keeps a dynamic list of neighbor servers. This list changes over time, and the list is significantly smaller than the complete list of all the servers in a system.

The evolution of the group of servers over time consists of two main stages in their functioning: the process of adding and deleting new servers and grouping system reconstruction process. The last process occurs when changing the terms of network existence and the corresponding performance characteristic ("distance") between the servers.

Figure 3:
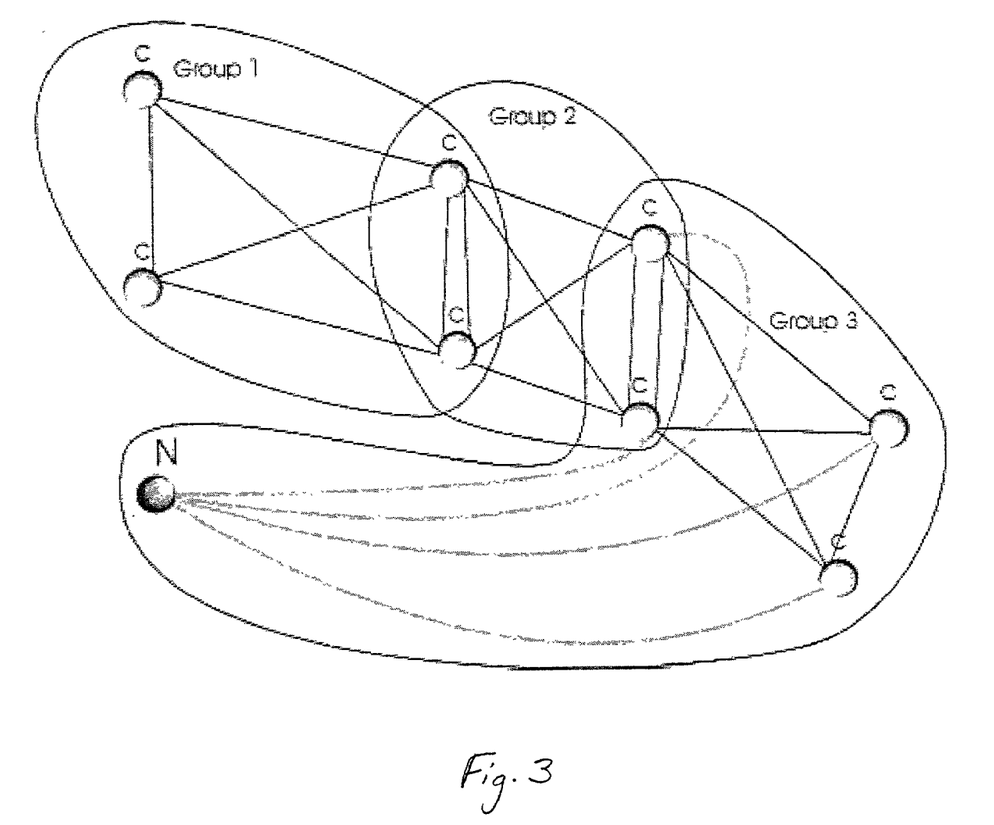
FIG. 3 is a schematic diagram of a new server N connecting to a group of servers.

When adding a new server, the new server must be put into the group where the limit on distance threshold between servers will be implemented with all the servers in the group. To provide the correct arrangement of servers, the algorithm connects the new server to the first group of servers (that comes in the way) and later a decision iterative improvement is used. As shown in FIG. 3, this means that, at first, the new server N connects to an existing group (Group 3) and gets the list of the servers that also belong to other groups (boundary servers).

Figure 4:
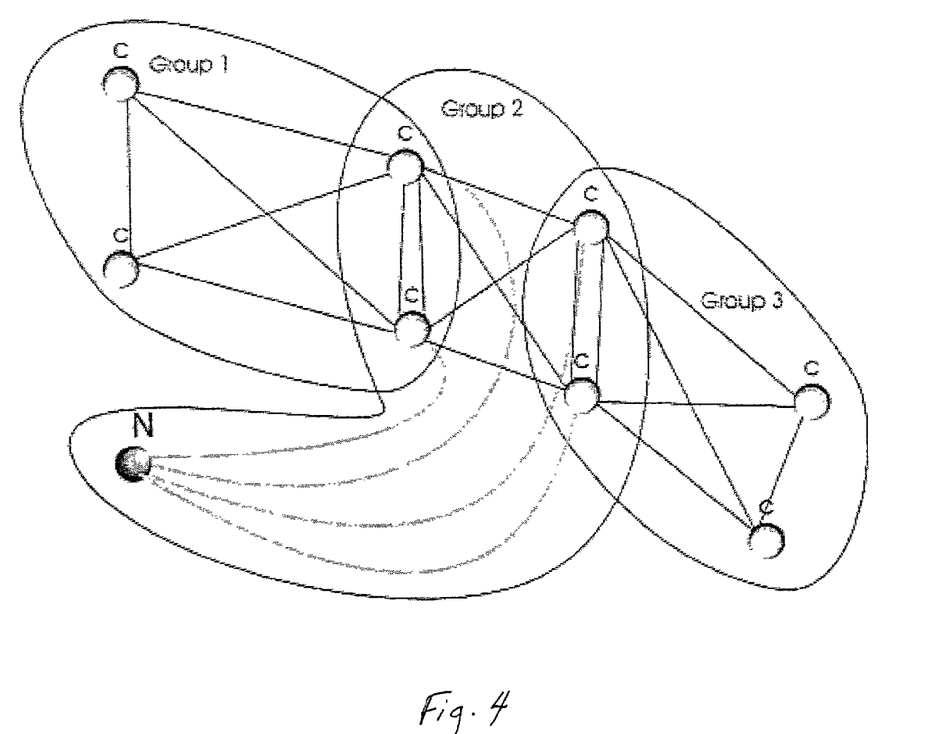
FIG. 4 is a schematic diagram of a new server N reconnecting to another group of servers.
Figure 5:
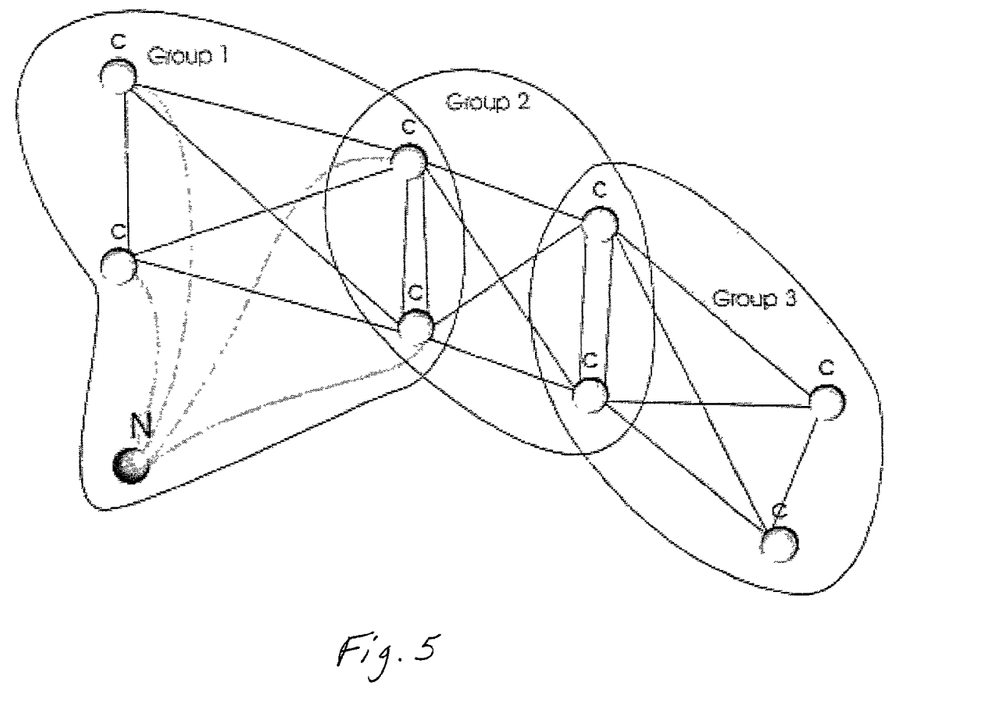
FIG. 5 is a schematic diagram of a new server N switching to the optimal group of servers.

Next, the new server gets the list of the group's members from each server and measures the "distance" between servers. Thus, the "distance" between group members is determined. The average distance is then calculated for every group and the minimal average distance is chosen. If this minimal average distance compares to the group to which the server belongs, then no actions are taken and it is considered that the server is already in the optimal group. As shown in FIG. 4, if the minimal average distance does not compare, the new server N switches off from the current group (Group 3) and reconnects to the server group with the minimal average "distance" (Group 2). Then the operation is repeated for all the neighbor groups. Thus, as shown in FIG. 5, eventually, the server N is connected to the group (Group 1) where the distance parameter of the links with the neighbor is optimal.

When a server disconnects from the system, all members of all of the groups where the separated server is located must delete that server from the list of the group's members. This can be done automatically via a periodic, prompt notification process which indicates whether the server is operational and accessible.

The second process in the system is the "distance" changing over time. The need for this process can be the changing of the load parameters of a channel between the servers. For example, this changing is needed because of the changing number of clients at the start or finish of the working day and the corresponding change in the number of clients using the Internet channel. Thus, the same procedure is necessary as that described in the algorithm for the addition of a new server. The server receives the list of all of the servers in the group that also belong to other groups, i.e., boundary servers. Then from each server it also gets the group member list and then measures the "distance" to each server. Thus, the "distance" to all group members can be determined.

Average distance is calculated for every neighbor group, and among the averaged distances the minimal distance is chosen. If the average distance is comparable to that of the group the server belongs to, no actions are taken and the server is deemed to be in the optimal group. If the average distance does not compare, the new server disconnects from the group and connects to a group where the average "distance" is less. The operation is then repeated for all the neighbor groups. Thus, eventually, the server is connected to the group where the distance parameters of the links with the neighbor is optimal.

The use of such grouping algorithms which are oriented to only local work with direct neighbor servers, allows optimal server arrangement for the chosen network performance characteristic. Using such connections, the response time can be optimized between servers, assuming that connection uses the chosen links between the servers.

Thus the support of a connected network of the servers that are organized into local groups to achieve the optimal connection between servers from the point of view of an input network metric is completed. Such a server network is used to organize the data storage. To access data storage, the client can connect to any server belonging to the network, as all of them are functionally identical and the file availability doesn't depend on the server chosen for connection.

The algorithm of the selection of server connection is the same as the algorithm of the new server connection to the network.

Figure 6:
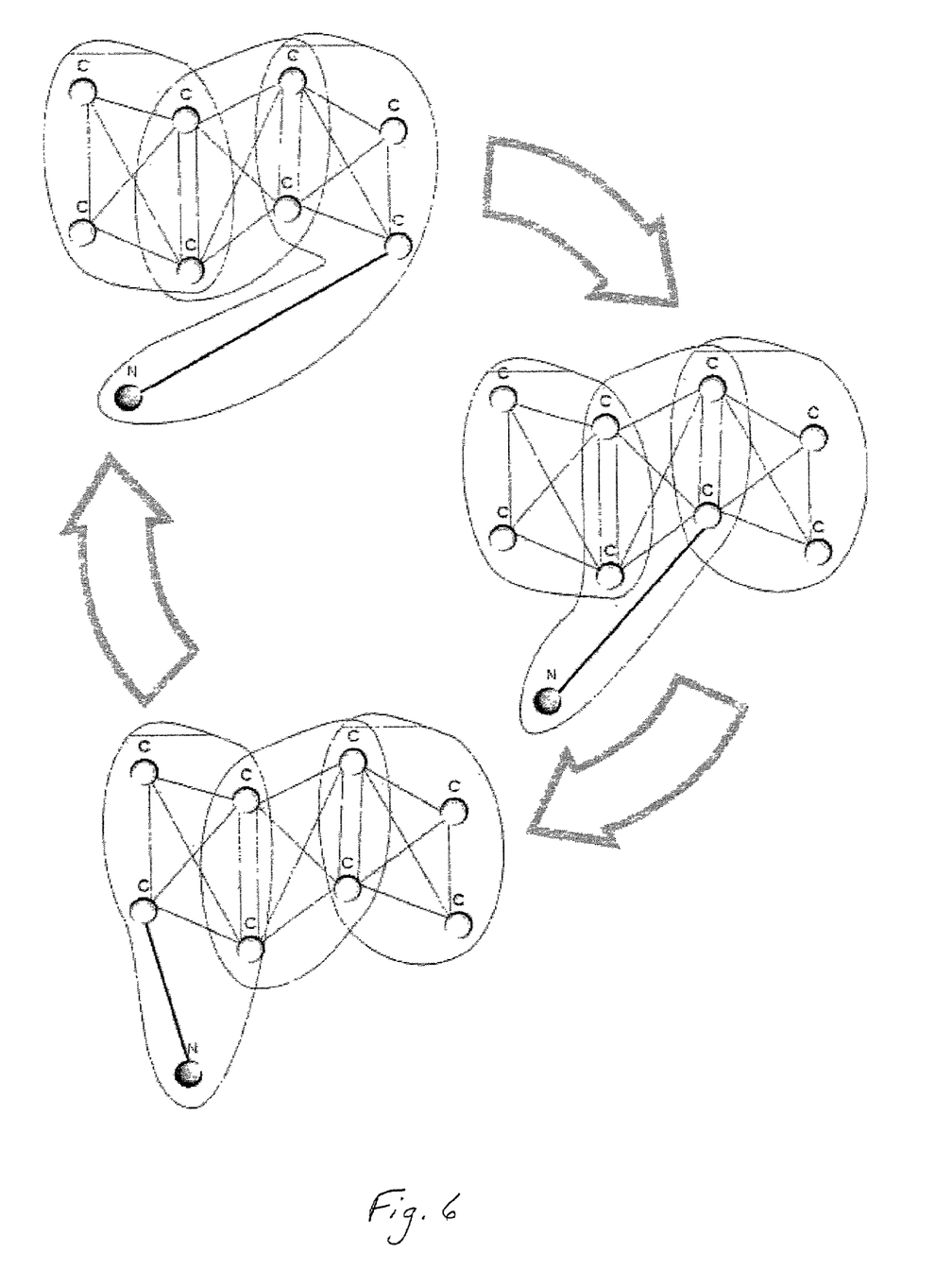
FIG. 6 is a schematic diagram of a client computer switching between servers in search of an optimal network "distance"

Initially, the client connects to any group of servers and then gets the list of the group's servers identifying those which belong to another group, i.e., boundary servers. Then, from every server the client gets the list of neighbor group servers and measures the "distance" to every server on the metric. Thus, the "distance" to all the members of the groups that are neighbors to which the chosen server belongs is determined. From all the "distance" figures, the minimal distance is chosen. If the chosen server belongs to the group to which the client has already connected, then no actions are taken and it is considered that the client has been optimized. If not, then the client disconnects and reconnects to the server to which the "distance" is the minimal one. Then the operation is repeated for all the neighbor groups. Thus, eventually, the client is connected to the server where the distance parameters of the connection to the server is optimal (see FIG. 6).

As mentioned above, it is necessary to repeat the procedure described in the previous algorithm periodically (usually in one hour intervals depending on the Internet state). The client gets the list of all servers in the current group, marking those that belong to several groups, i.e., boundary servers. Then the client gets the list of neighbor group members form the boundary servers and measures the "distance" to each of the boundary servers on the metric. Thus, the "distance" to the members of all neighbor groups is determined among all the distances. The minimal distance is then chosen. If the minimal distance value is the distance to the server to which the client has already been connected, then it is considered that the client has an optimal connection and no actions are performed. Otherwise, the client disconnects from the current server and reconnects to the server having a lesser "distance" value. The same procedure is then repeated for the neighbors of the new group. Thus, eventually the client is connected to the server with the optimal "distance" parameters.

To implement the disclosed file storage system of connected servers, it is suggested that all files should be divided into two classes: common data files and directory files.

For access to common files, there is a common name space for files. To access a particular file, the client specifies the file name and the path to the file from the root directory. The path does not depend either on client position in the Internet or the current server to which the client is connected.

The system of directory files defines the way the file requested by the client will be restored. The directory file transforms the logical name of the file requested into an identifier that is used to obtain file content. Such procedure is to be performed for each subdirectory starting with the upper one.

Figure 7:
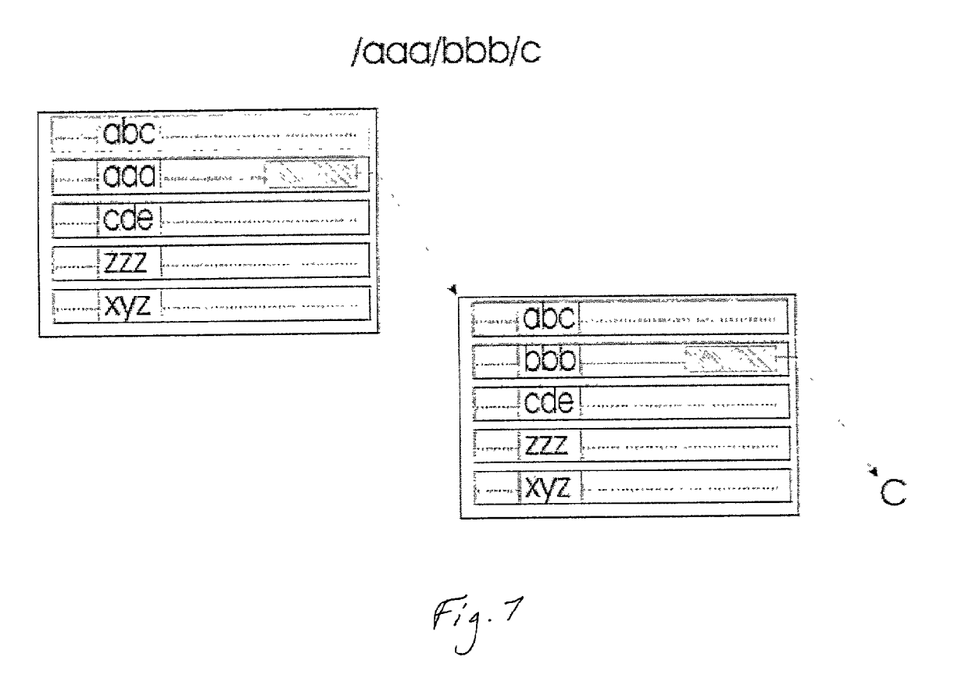
FIG. 7 is a schematic diagram of the procedure for a file search to find out a unique identifier on the logic name.

For example, to access the file having name "c" and the path "aaa/bbb/c", the directory file is found from a list of the files in the root directory. Then to choose the record corresponding to the file "aaa" from the list, we get information that "aaa" is the directory file itself. The procedure is repeated for the file "bbb" and finally, the file "c" is found (see FIG. 7).

Thus, the directory is the set of corresponding file records. Every file record contains the logical file name and the unique file identifier.

For the entire system, all files including the directory ones are the same; each file has a unique file identifier which is used to reconstruct the file at the client level. For the directory file, the server itself can be considered a client if it asks for access to the directory as described above. The unique file identifier is generated when the file is created. Its uniqueness is guaranteed with some probability by the local algorithms without a need for confirmation.

To work with such a file storage system, the client connects to the server using the method described above and sends the request for the file operation, for example, to write a file record. To do so, the client divides the file into a set of pieces with the features mentioned above, and sends them to the server. Then the server distributes these pieces among all of the servers of the group. Then only the boundary servers of the group, in turn, send these pieces further until all of them are distributed between the servers (it can be one or several pieces per server). While the file is dividing into pieces, a unique identifier is generated for each of the pieces that later is used for identification.

To read the file, the client connects to any of the system servers and sends the request with the file name. The server transforms the requested file name into a unique identifier, using the procedure mentioned above and collects the necessary number of the file pieces. At first, the server checks if these pieces are available on the server, if the number of pieces available is insufficient, the server then forwards the request to other group servers and then the boundary servers, in turn, to send the requests to the neighbors. Thus, the server collects the necessary file pieces and sends them to the client. The client then restores the original file from the pieces.

According to this scheme, data flows through the less utilized network channel, thus guaranteeing an optimal response time. Moreover, as the server receives the requested file pieces from the neighbor servers in parallel mode, the pieces required to restore the file are collected much faster as compared to receipt of the pieces from a single server. Thus, simultaneous use of several access channels results in optimal network loading. Moreover, if the file pieces are requested by several neighbor servers simultaneously, the server that sends a piece faster will be sending more information. This is because when the first piece is received, the server is ready to send the second one. Utilization of maximum throughput capability of the servers provides the highest speed and reduces the request processing time and network overloading.

As a result of the client-server topology algorithm described above, client-server requests use optimal network traffic, which minimizes delays in request processing. The client is connected to the server with the highest throughput capacity.

The disclosed system and method has been disclosed by reference to its preferred embodiment. Those of ordinary skill in the art will understand that additional embodiments of the disclosed system and method are made possible by the foregoing disclosure. Such additional embodiments shall fall within the scope and meaning of the appended claims.

What is claimed is:

1. A system for distributed file storage comprising:
a plurality of servers providing, to a plurality of clients, file access services for accessing files stored on the plurality of servers; and
a dynamic list of neighbor servers maintained by each server, wherein the neighbor servers are grouped as a subset of the plurality of servers, switching at least one server of the plurality of servers into a neighbor group of servers based on network distance,
wherein each file is stored in the form of a plurality of N pieces on N servers, the N pieces being generated from the file,
wherein the list is used to obtain information for reconstructing files stored on the neighbor servers, such that any K out of the N pieces can be used to reconstruct any file,
wherein a server belonging to more than one group acts as a boundary server, and
wherein boundary servers are used to transfer pieces of the file to servers of groups other than a group to which a client has connected.

2. The system of claim 1, wherein the servers use a peer-to-peer network for communication with each other.

3. The system of claim 1, wherein the files are stored using a peer-to-peer network.

4. The system of claim 1, wherein at least one of the servers is a logical server that includes a plurality of physical servers connected via a network.

5. The system of claim 1, wherein each server belongs to a group defined by its corresponding list,
wherein a server that belongs to multiple groups maintains corresponding multiple lists for each group to which it belongs, and
wherein, upon receiving a request for a file, the server distributes the request to each of the multiple groups.

6. The system of claim 1, wherein none of the pieces is unique.

7. The system of claim 1, wherein the servers are organized into a plurality of groups such that server-to-server response time between any two servers of the same group does not exceed a predetermined limit, and
wherein, when a new server is connected to one of the groups, the new server uses information of the boundary servers to connect to a group so as to have optimal server-to-server response time to its neighbors within its group.

8. The system of claim 7, wherein, when one server is disconnected from the system, the remaining servers use information of the boundary servers to reconfigure their groups so as to have optimal server-to-server response times to their neighbors within their groups.

9. A method for distributed file storage comprising:
dividing a plurality of servers into a plurality of groups, with each server belonging to at least one group;
on each server, maintaining a dynamic list of neighbor servers belonging to the same group, wherein each group is a subset of the plurality of servers; switching at least one server of the plurality of servers into a neighbor group of servers based on network distance;
supporting file access services on each of the servers;
transforming a file into a plurality of N pieces that are derived from the file, such that any K out of the N pieces can be used to reconstruct any file; and
storing each of the pieces on N servers selected from the list,
wherein a server belonging to more than one group acts as a boundary server, and
wherein boundary servers are used to transfer pieces of the file to servers of groups other than a group to which a client has connected.

10. The method of claim 9, further comprising using a peer-to-peer network for communication between the servers.

11. The method of claim 9, further comprising using a peer-to-peer network for storing the file.

12. The method of claim 9, further comprising maintaining functional equivalence among the servers.

13. The method of claim 9, further comprising verifying availability of the neighbor servers.

14. The method of claim 9, further comprising:
polling the servers on the dynamic list of the neighbor servers and measuring a network distance for each server;
keeping each available server on the dynamic list in the same group;
removing unavailable servers from the dynamic list of the same group; and
switching at least one server of the plurality of servers into a neighbor group of servers if the measured network distance is lower than a predetermined threshold.

15. The method of claim 14, wherein better network connectivity is determined based on the network distance.

16. The method of claim 14, further comprising:
polling the dynamic list;
connecting a client to a server on the dynamic list;
switching the client to a different server on the dynamic list that has a smaller workload or lower network distance relative to the client; and
delivering to the client a file requested by the client that is stored on the servers.

17. The method of claim 14, further comprising:
polling the dynamic list;
connecting a client to a server on the dynamic list;
switching the client to a different server on the dynamic list that has a lower network distance from a perspective of the client; and
delivering to the client a file requested by the client that is stored on the servers.

18. The method of claim 9, wherein the list is a static list of servers.

19. The method of claim 9, further comprising:
maintaining multiple lists for a server that belongs to multiple groups; and,
upon receiving a request for a file, distributing the request to servers selected from the multiple groups.

20. The method of claim 9, wherein, when one server is disconnected from the system, the remaining servers use information of the boundary servers to reconfigure their groups so as to have optimal server-to-server response times to their neighbors within their groups.

21. A method of accessing files in a distributed file storage system comprising:
dividing a plurality of the servers into a plurality of groups, wherein each server belongs to at least one group, and wherein each group is a subset of the plurality of servers;
supporting file access services on each of the servers for accessing a file stored on the servers;
at each server, maintaining a dynamic list of neighbor servers that belong to the same group; switching at least one server of the plurality of servers into a neighbor group of servers based on network distance;
generating a plurality of N pieces from the file; and
distributing the plurality of N pieces to the neighbor servers in the same group in order to achieve a desired fault tolerance level, wherein the fault tolerance level is defined by how many servers (K) out of the total number of N servers on which the N file pieces are stored, can fail, such that any K out of the N pieces can be used to reconstruct any file,
wherein a server belonging to more than one group acts as a boundary server, and
wherein boundary servers are used to transfer pieces of the file to servers of groups other than a group to which a client has connected.

22. The method of claim 21, further comprising using a peer-to-peer network for communication between the servers.

23. The method of claim 21, further comprising maintaining functional equivalence of the servers for purposes of storing the file.

24. The method of claim 21, further comprising verifying availability of the neighbor servers.

25. The method of claim 21, further comprising:
polling the list of neighboring group servers and measuring a relative network distance for each client-server pair;
connecting a client to any of the servers on the list using the measured metric;
switching the client to a server on the list that has a lower relative network distance and a smaller workload to improve a level of service; and
delivering, to the client, the file requested by the client.

26. The method of claim 21, further comprising:
polling servers on the list that belong to the same group;
connecting a client to any of the servers on the list that belong to the same group;
switching the client to a server on the list that has a smaller workload; and
delivering, to the client, the file that is requested by the client.

27. The method of claim 26, further comprising:
identifying a name of the file in namespace;
sending a request for the file from the client to the server to which the client is connected;
sending a request for the file from the server to which the client is connected to a neighbor server;
distributing the request to other servers if the server to which the client is connected cannot provide the file pieces information;

checking for file pieces in a local cache of each server that received the request;
sending the pieces to the server to which the client is connected;
transferring the pieces to the client; and
assembling the file on the client.

28. The method of claim 26, further comprising sending all the pieces from the neighbor servers to the server to which the client is connected simultaneously.

29. The method of claim 21, wherein the list is a static list of servers.

30. The method of claim 21, wherein none of the pieces is unique.

31. A method of naming files in a distributed file storage system comprising:
dividing a plurality of servers into a plurality of groups such that each server belongs to at least one group, wherein each group is a subset of the plurality of servers;
supporting file access services on each of the servers for accessing files stored on the servers; at each server, maintaining a dynamic list of neighbors server that belong to the same group; switching at least one server of the plurality of servers into a neighbor group of servers based on network distance;
giving file names for the uniformly and independent of location of the files on the servers;
storing the files on N of the servers using the names, wherein each file is transformed into a plurality of pieces that are generated from the file, such that any K out of the N pieces can be used to reconstruct any file, wherein a server belonging to more than one group acts as a boundary server, and
wherein boundary servers are used to transfer pieces of the file to servers of groups other than a group to which a client has connected; and
accessing the files using the file access services from any of servers.

32. The method of claim 31, further comprising using a peer-to-peer network for communication between the servers.

33. The method of claim 31, further comprising maintaining functional equivalence of the servers.

34. The method of claim 31, further comprising verifying availability of the neighbor servers.

35. The method of claim 31, further comprising:
on each server, maintaining a dynamic list of the neighbor servers in the same group;
polling servers on the dynamic list;
connecting a client to any of the servers on the dynamic list;
switching the client to a server on the dynamic list that has lower network distance to improve level of service; and
delivering to the client a file requested by the client that is stored on the servers.

36. The method of claim 31, further comprising:
on each server, maintaining a dynamic list of the neighbor servers;
polling servers on the dynamic list that belong to the same group;
connecting a client to any of the servers on the dynamic list;
switching the client to a server on the dynamic list that has a smaller workload; and
delivering to the client a file requested by the client that is stored on the servers.

37. The method of claim 31, further comprising:
maintaining a uniform name space as a tree with a common root and a logical path to each stored file as part of the distributed file storage system; and
maintaining data files and directory files to be stored in the distributed file storage system.

38. The method of claim 37, further comprising;
maintaining the directory files as executable files with their own executable code and data; and
providing translation from a logical path inside the uniform name space to a unique file identifier using the directory files.

39. A system for organizing distributed file storage comprising:
N functionally equivalent servers each providing file access services, for a plurality of clients, to files stored on the servers, such that when a file is divided into N pieces stored on the N servers, any K out of the N servers can be used to reconstruct the file; and
each file being transformed into the N pieces that are generated from the file and stored on the N servers, at each server, maintaining a dynamic list of neighbors server that belong to the same group; switching at least one server of the plurality of servers into a neighbor group of server based on network distance,
wherein information for reconstructing the files is obtained from the servers,
wherein the servers are organized into groups, each group being a subset of the plurality of N servers, and wherein a server belonging to more than one group acts as a boundary server, and
wherein boundary servers are used to transfer pieces of the file to servers of groups other than a group to which a client has connected.

40. The system of claim 39, further comprising a dynamic list of neighbor servers maintained by each server,
wherein the neighbor servers are a subset of the plurality of servers, and
wherein the dynamic list is used to obtain the information for reconstructing the files.

41. The system of claim 39, further comprising a static list of neighbor servers maintained by each server,
wherein the neighbor servers are a subset of the plurality of servers, and
wherein the static list is used to obtain the information for reconstructing the files.

42. A computer program product for distributed file storage, the computer program product comprising a computer useable medium having computer program logic recorded thereon for controlling a processor, the computer program logic comprising:
computer program code means for organizing a plurality of servers into a plurality of groups, with each server belonging to at least one group;
on each server, computer program code means for maintaining a dynamic list of neighbor servers belonging to the same group; switching at least one server of the plurality of servers into a neighbor group of servers based on network distance;
computer program code means for supporting file access services on each of the servers;
computer program code means for transforming a file into a plurality of pieces that are derived from the file, such that any K out of the N pieces can be used to reconstruct any file; and
computer program code means for storing each of the pieces on N servers selected from the lists, wherein a server belonging to more than one group acts as a boundary server, and wherein boundary servers are used to transfer pieces of the file to servers of groups other than a group to which a client has connected.

43. A method of accessing files in a distributed file storage system comprising:

organizing a plurality of the servers into dynamically reconfigurable groups, wherein each server belongs to at least one group that is reconfigurable based on minimum network distance, wherein each group is a subset of the plurality of servers; at each server, maintaining a dynamic list of neighbors server that belong to the same group; switching at least one server of the plurality of servers into a neighbor group of servers based on network distance;

supporting file access services on each of the servers for accessing a file distributed among the servers;

generating a plurality of N pieces from the file; and distributing the plurality of N pieces to N of the neighbor servers in the same group in order to achieve a desired fault tolerance level based on how many servers (K) out of the plurality of servers are available, such that any K out of the N pieces can be used to reconstruct any file, wherein a server belonging to more than one group acts as a boundary server, and wherein boundary servers are used to transfer pieces of the file to servers of groups other than a group to which a client has connected.

44. A system for distributed file storage comprising:

a plurality of servers providing, to a plurality of clients, file access services for accessing files stored on the plurality of servers;

wherein the servers are organized into a plurality of groups such that server-to-server response time between any two servers of the same group does not exceed a predetermined limit;

wherein a server belonging to more than one group acts as a boundary server;

wherein, when a new server is connected to one of the groups, the new server uses information of the boundary servers to connect to a group so as to have optimal server-to-server response time to its neighbors within its group;

wherein, when one server is disconnected from the system, the remaining servers use information of the boundary servers to reconfigure their groups so as to have optimal server-to-server response times to their neighbors within their groups; and a dynamic list of neighbor servers of each server's group maintained by each server, wherein the neighbor servers are a subset of the plurality of servers, switching at least one server of the plurality of servers into a neighbor group of servers based on network distance;

wherein each file is stored in the form of a plurality of N pieces, the pieces being generated from the file and stored on N servers of the plurality of servers, wherein boundary servers are used to transfer pieces of the file to servers of groups other than a group to which a client has connected, wherein the list is used to obtain information for reconstructing files stored on the neighbor servers, and wherein any client can use any of the plurality of servers to access any of its files stored on the system.

* * * * *